No. 755,590. PATENTED MAR. 22, 1904.
E. WINANS.
POWER TRANSMITTING MACHINERY.
APPLICATION FILED JAN. 8, 1904.
NO MODEL.
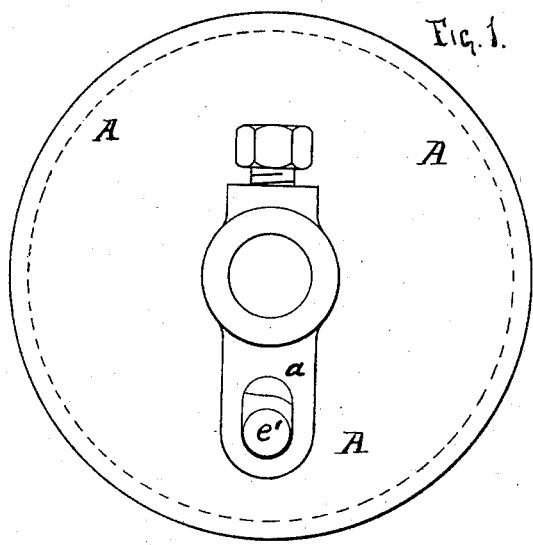
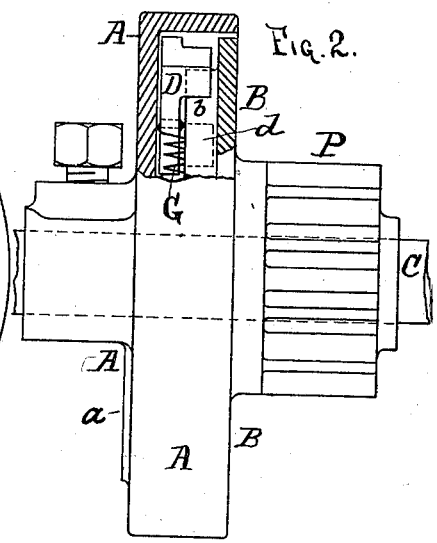
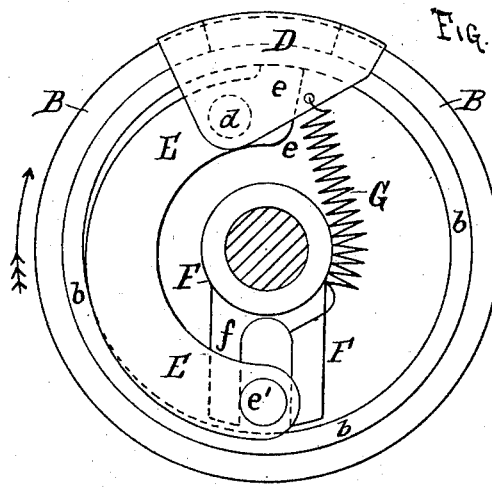
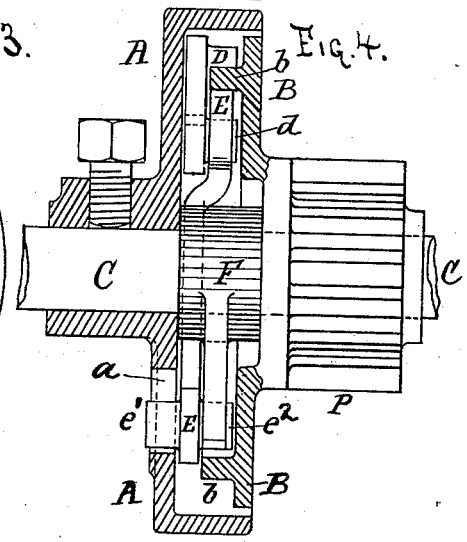
WITNESSES:-
J. M. Andrews
N. H. Ten Broeck
INVENTOR:-
Edwin Winans
by Wm H. Weightman
atty.

No. 755,590. Patented March 22, 1904.

UNITED STATES PATENT OFFICE.

EDWIN WINANS, OF NEW YORK, N. Y.

POWER-TRANSMITTING MACHINERY.

SPECIFICATION forming part of Letters Patent No. 755,590, dated March 22, 1904.

Application filed January 8, 1904. Serial No. 188,198. (No model.)

*To all whom it may concern:*

Be it known that I, EDWIN WINANS, a citizen of the United States, residing in the city, county, and State of New York, have invented certain new and useful Improvements in Power-Transmitting Machinery, of which the following is a specification, reference being had to the accompanying drawings.

My invention relates to clutch or friction pulleys or couplings whereby power, motion, or revolution to be transmitted in any direction is passed regularly and automatically from a power or motion receiving medium to a power and motion delivering medium.

The object of the invention is the production of a power-transmitting device simple and economical in construction, prompt and positive in its operation, and adaptable to a continuous shaft revolution, as well as to an intermittent application of power, motion, and revolution through treadle mechanisms of the sewing-machine, lathe, and like apparatus.

My improvements consist in the special construction, arrangement, and combination of the several parts, portions, and details comprising the apparatus, as herein shown, described, and set forth.

In the accompanying drawings, Figure 1 represents an outer face view of an apparatus embodying my improvements. Fig. 2 represents a side or edge view of the same in partial section. Fig. 3 represents a face view of the operative details. Fig. 4 represents a cross-section view of the same.

Similar letters of reference designate like parts, portions, or details in the several figures of the drawings.

A and B designate the two main members of the device for receiving and transmitting power, motion, or revolution, the two together inclosing the operative details and acting as receiving and delivering mediums.

C designates a supporting-shaft for members A and B. Each of the members A and B may represent the face, flange, or hub of a possible gear-wheel, pulley, or similar power-transmitting means.

D designates a grip-shoe adapted to wear and act upon the outer face of a circular grip rib or wall $b$ of member B.

E designates a lever-grip fulcrumed on a pin $d$ of grip-shoe D and adapted to wear and act upon the inner face of the circular grip rib or wall $b$ of member B at its short arm end $e$ and connects with the member A by means of the slotted hole or pocket $a$ and outwardly-projecting pin $e'$ and with a controlling collar or sleeve F by means of the inwardly-projecting pin $e^2$. The collar or sleeve F wears and is supported upon the shaft C.

G designates a spring or elastic connection between the controlling-collar F and the grip-shoe D as a special means for retaining the grip-shoe D against the outer face of grip rib or wall $b$ ready for a prompt friction grip as soon as a motion force is applied. When the coupling is quiet or at a standstill, the strain of spring G causes an arm $f$ of the controlling-collar F to press against the inward extension $e^2$, attached to the lever-grip E, draws, by means of pin $d$ and contact of the short arm $e$ with the inner face of circular grip-rib $b$, the grip-shoe D to an easy contact with the outer face of circular grip-rib $b$ ready for a prompt friction grip.

In the operation of the device, as illustrated, force and revolution applied to the wheel portion at P in the direction indicated by the arrow of Fig. 3 are transmitted through member B and its circular grip-wall $b$ to the grip-shoe D and the lever-grip E, both fulcrumed at $d$, thence to the end pin $e'$ of lever-grip E to the member A for transmission to shaft C or similar connected device. With a reversed revolution of wheel connection P and connected member B all friction and grip is stopped and no motion or revolution is transmitted to the member A.

Force and power may be applied originally to the member A, whence the pin $e'$ takes up the work of transmission, operates lever-grip E to effect the friction and grip, and thence transmit it to the member B and its wheel connection P, but in an opposite direction to that indicated by the arrow in Fig. 3.

What I claim as new, and desire to secure by Letters Patent, is—

In a power-transmitting device, in combination with the driving and driven members and their carrying-shaft, a grip-shoe and lever-grip connected together by a fulcrum-pin and wearing upon the outer and inner wall faces of one of said members, a controlling-collar on said carrying-shaft, a pin at the opposite end of said lever-grip connecting it with the controlling-collar and the other of said members, and a spring connection between said controlling-collar and the grip-shoe, substantially as and for the purposes set forth.

EDWIN WINANS.

Witnesses:
    WM. H. WEIGHTMAN,
    HENRY J. WEHLE.